United States Patent [19]

Cantrell et al.

[11] Patent Number: 4,532,515

[45] Date of Patent: Jul. 30, 1985

[54] ANGLE OF ARRIVAL MEASUREMENTS FOR TWO UNRESOLVED SOURCES

[76] Inventors: Ben H. Cantrell, 7009 Catlett St., Springfield, Va. 22151; William B. Gordon, 14013 Monorvale Rd., Rockville, Md. 20853; Gerard V. Trunk, 503 Tolna St., Baltimore, Md. 21224

[21] Appl. No.: 347,676

[22] Filed: Feb. 10, 1982

[51] Int. Cl.$^3$ ............................................. G01S 13/00
[52] U.S. Cl. ................................. 343/16 R; 343/424; 343/5 NQ
[58] Field of Search ............... 343/5 NQ, 16 M, 16 R, 343/378, 417, 370, 424

[56] References Cited

U.S. PATENT DOCUMENTS

| | | | |
|---|---|---|---|
| 3,378,843 | 4/1968 | Sherman | 343/16 R |
| 3,945,010 | 3/1976 | Wardrop | 343/17.2 PC |
| 3,972,041 | 7/1976 | Howard | 343/17.7 |
| 3,987,442 | 10/1976 | McLeod, Jr. | 343/17.7 |
| 4,053,885 | 10/1977 | Tomita et al. | 343/17.7 |
| 4,095,224 | 6/1978 | Dounce et al. | 343/17.1 R |
| 4,117,538 | 9/1978 | Shrader et al. | 343/5 NQ |
| 4,173,017 | 10/1979 | Burlnge et al. | 343/7.7 |
| 4,219,816 | 8/1980 | Schenkel et al. | 343/16 M |
| 4,231,005 | 10/1980 | Taylor, Jr. | 343/5 NQ |

Primary Examiner—Maynard R. Wilbur
Assistant Examiner—Gilberto Barrón, Jr.

[57] ABSTRACT

A method of estimating the angles of arrival $\theta 1$ and $\theta 2$ of two closely spaced radar targets of which one target may be the virtual image of the other target. The targets are illuminated with a radar beam of wavelength WL, and the resulting echos from the targets are received at three directive antennas whose apertures are coplanar and whose phase centers are colinear and spaced a distance D apart. The received echos are converted to complex numbers S1, S2 and S3 representing the magnitude and phase of the respective echos received by the three directive antennas. If the plane of symmetry of the two targets is known, the value of a parameter WD is determined which minimizes $L = |S1 - WB(WD + WD^*)S2 + WB^2 S3|^2$, where $WB = \exp(j2\pi D\theta B/WL)$ and $\theta B$ is the known angle bisecting the angles of arrival of the two targets. If the plane of symmetry of the two targets is not known, the values of WD and WB are determined by solving for WD and WB which minimize L. The final step, in each case, is calculating the angles of arrival $\theta 1$ and $\theta 2$ from $\theta 1 = (WL2\pi D)\tan^{-1}[\mathrm{Im}(WD \cdot WB)/\mathrm{Re}(WD \cdot WB)]$, and $\theta 2 = (WL/2\pi D)\tan^{-1}[\mathrm{Im}(WD^* \cdot WB)/\mathrm{Re}(WD^* \cdot WB)]$.

3 Claims, 2 Drawing Figures

ANGLE OF ARRIVAL MEASUREMENTS FOR TWO UNRESOLVED SOURCES

BACKGROUND OF THE INVENTION

This invention relates generally to the field of radar, and more particularly to systems for tracking radar targets.

Conventional tracking radars are designed on the tacit assumption that there is only one target present within one or two beam widths of angular spread. Consider a phased-array radar observing two independent targets at the same range. Assume that the targets are not resolvable in the range or Doppler dimensions and that they are spaced close enough so that a beam oriented in the direction of one of them will pick up appreciable energy from the other. Conventional tracking radars are unable to make accurate measurements on either target under these conditions.

The problem of estimating the angle of arrival of two closely spaced targets has received considerable attention. An investigation of the maximum likelihood estimate (MLE) of the angles of arrival is presented in the article "Low Angle Tracking in the Presence of Multipath", by W. D. White, IEEE Trans. on Aerospace and Electronics Systems, Vol. AES-10, No. 6, Nov. 1974, pp. 835-852 which is hereby incorporated by reference. White calculated the mean-square elevation error for the two target case when the signal-to-noise ratio (SNR) was large and hence the error was small. This calculation was made for the symmetric case (target and image are symmetrically located about the center of the elevation antenna pattern) and for the nonsymmetric case. The symmetric case occurs when the antenna is stabilized and hence the symmetry plane of the elevation antenna pattern coincides with the flat reflecting plane.

There are several problems associated with the maximum likelihood estimates for the individual elements of an array. First, the resulting equations are difficult to solve and require search techniques. Furthermore, it is difficult to ensure that the global or absolute minimum is obtained because search techniques operate on the principle of finding points of zero slope and may terminate at one of those points which is not the absolute minimum. Second, a large number of receivers is required for element processing, which may make a practical system costly.

SUMMARY OF THE INVENTION

It is therefore an object of this invention to measure the angles of arrival of two closely spaced radar targets.

This and other objects of the present invention are achieved by a method of estimating the angles of arrival $\theta 1$ and $\theta 2$ of two closely spaced radar targets. One target may be the virtual image of the other target. The targets are illuminated with a radar beam of wavelength WL, and the resulting echos from the targets are received at three directive antennas whose apertures are coplanar and whose phase centers are colinear and spaced a distance D apart. The received echos are converted to complex numbers S1, S2 and S3 representing the magnitude and phase of the respective echos received by the three directive antennas. If the plane of symmetry of the two targets is known, the value of a parameter WD is determined which minimizes $L = |S1 - WB(WD + WD^*)S2 + WB^2 S3|^2$, where $WB = exp(j2\pi D\theta B/WL)$ and $\theta B$ is the known angle bisecting the angles of arrival of the two targets. The notation WD* indicates the complex conjugate of WD. If the plane of symmetry of the two targets is not known, the values of WD and WB are determined by solving for WD and WB which minimize L. The final step, in each case, is that of calculating the angles of arrival $\theta 1$ and $\theta 2$ from $\theta 1 = (WL/2\pi D)\tan^{-1}[Im(WD \cdot WB)/Re(WD \cdot WB)]$, and $\theta 2 = (WL/2\pi D)\tan^{-1}[Im(WD^* \cdot WB)/Re(WD^* \cdot WB)]$.

The method is easy to implement and its accuracy is comparable to that obtained by applying the maximum likelihood method.

Additional advantages and features will become more apparent as the subject invention becomes better understood by reference to the following detailed description when considered in conjunction with the accompanying drawings wherein:

DESCRIPTION OF THE PREFERRED EMBODIMENT

Figure 1:
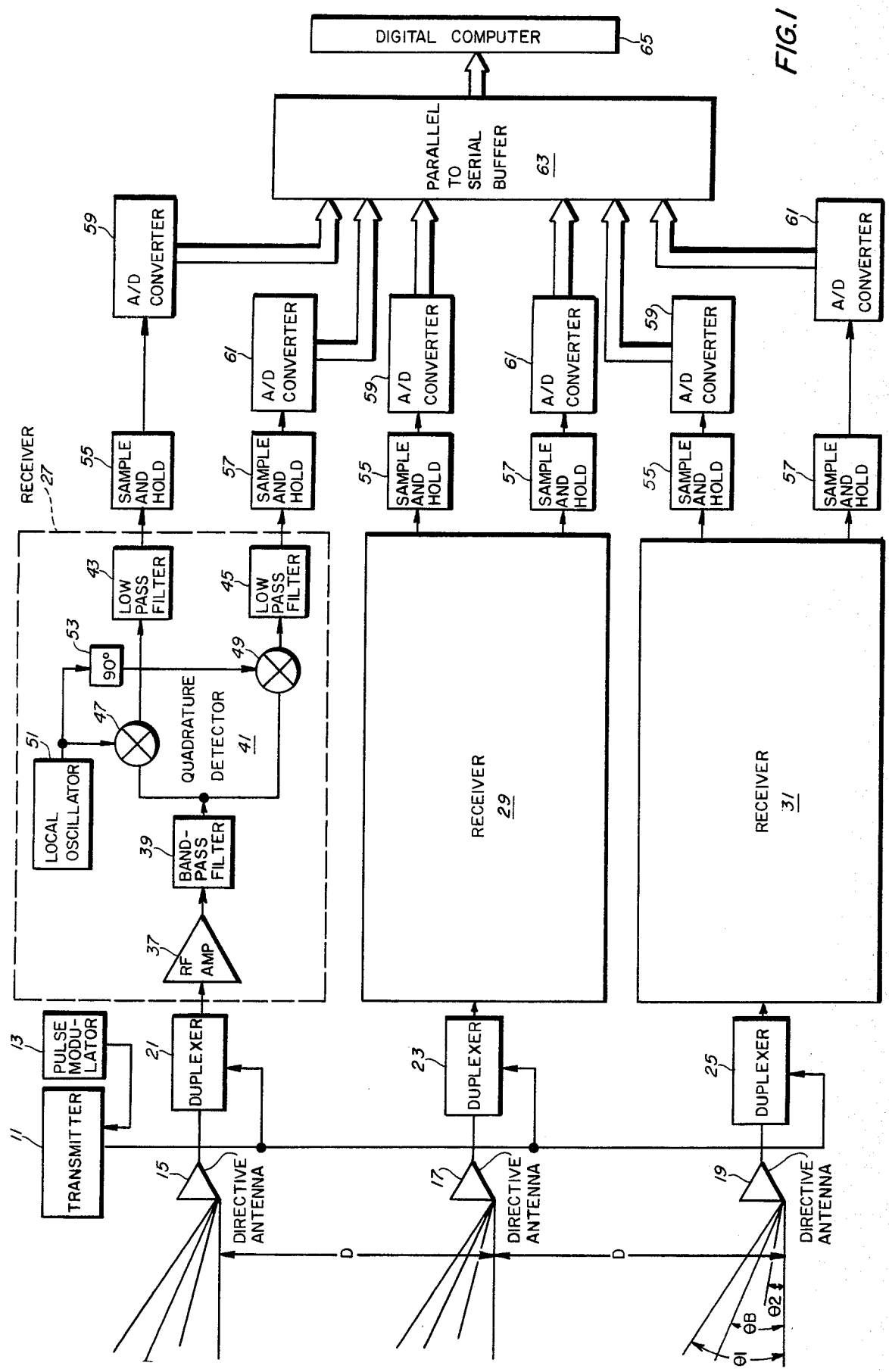
FIG. 1 is a block diagram of an apparatus for estimating the angles of arrival of two closely spaced radar targets in accordance with the principles of the invention.

FIG. 1 shows apparatus for estimating the angles of arrival $\theta 1$ and $\theta 2$ of two closely spaced radar targets, of which one target may be the virtual image of the other target arising from a strong reflector such as a sea surface. A transmitter 11 is pulsed by a modulator 13 to generate a repetitive train of pulses on a carrier of wavelength WL. The waveform generated by the transmitter travels via a transmission line to three directive antennas 15, 17 and 19 where it is radiated into space to illuminate the two targets (not shown) whose angles of arrival are $\theta 1$ and $\theta 2$. The three directive antennas 15, 17 and 19 are pointed in the same direction (which may be varied at will) with their apertures coplanar, and their phase centers colinear and spaced a distance D apart. The antennas 15, 17 and 19 are used for both transmitting and receiving. Duplexers 21, 23 and 25 channel the respective radar echos received by the antennas 15, 17 and 19 to receivers 27, 29 and 31. The receivers 27, 29, and 31 are conventional and identical, the detailed circuitry of receiver 27 being shown as illustrative of such units. The echo signal received by each antenna is passed through an RF amplifier 37 and a bandpass filter 39 to a quadrature detector 41 whose outputs are in turn connected to a pair of low pass filters 43 and 45. The quadrature detector may, for example, comprise a pair of balanced mixers 47 and 49. The RF signal from the filter 39 is mixed in one of the mixers 47 with the output of a local oscillator 51 and in the other mixer 49 with the output of the local oscillator after being passed through a 90-degree phase shifter 53. The outputs of the low-pass filters 43 and 45, which are respectively inphase and quadrature component baseband signals, are sampled in sample-and-hold circuits 55 and 57, and converted in analog-to-digital connectors 59 and 61 to digital numbers representing respectively the real and imaginary parts of a complex digital number. The outputs of the analog-to-digital converters 59 and 61 comprise a dual input to a parallel-to-serial buffer 63, which input comprises a complex digital number representing the magnitude and relative phase of the respective echo received by the antenna to which the pair of analog-to-digital converters 59 and 61 is connected. These complex digital numbers may be designated S1, S2 and S3, with S1 corresponding to the echo received by the first antenna 15, S2 that of the second antenna 17, and S3 that of the third antenna 19. A digital computer 65 utilizes the outputs from the buffer 63 to calculate an estimate of the angles of arrival $\theta 1$ and $\theta 2$ of the two targets.

Figure 2:
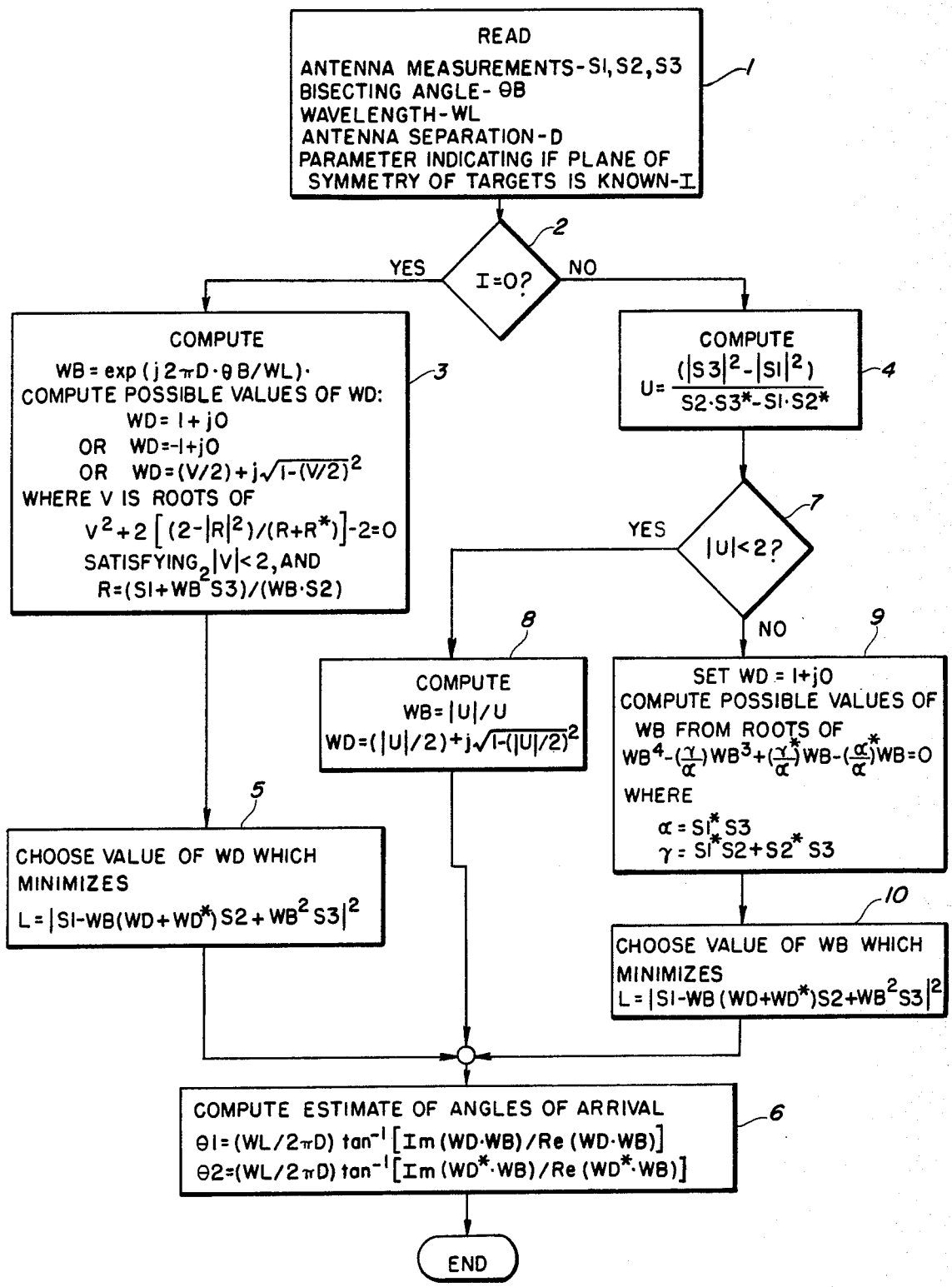
FIG. 2 is a flow chart of a program stored in the digital computer to implement the invention.

FIG. 2 is a flow chart of a program stored in the digital computer 65 to implement the present invention.

In block 1, the antenna measurements S1, S2 and S3 are read into the computer 65 from the buffer 63. Also read in are the wavelength WL of the radar, the antenna separation D, and the value of a parameter I defined as follows: I=0 if the plane of symmetry of the two targets is known (the case for a single target and its virtual image); I=1 otherwise. If I=1, the known bisecting angle $\theta B$ is also read in.

Block 2 is a decision block; it asks the question "Is I=0?". If the test is positive, the program branches to block 3.

In block 3, a parameter WB is computed from $WB = \exp(J2\pi D \cdot \theta B/WL)$; and four possible values of a parameter WD are determined. The four possible values are given by $WD=1+j0$, or $WD=-1+j0$, or $WD=(V/2)+j\sqrt{1-(V/2)^2}$, where V is bi-valued. The two values of V are the roots of $V^2+2[(2-|R|^2)/(R+R^*)]-2=0$, satisfying $|V|<2$, where $R=(S1+WB^2S3)/(WB \cdot S2)$.

In the next block 5, the value of the parameter WD which minimizes $L=|S1-WB(WD+WD^*)S2+WB^2S3|^2$ is chosen from the four possible values computed in block 3.

Finally, in block 6, an estimate of the angles of arrival if computed from $\theta 1=(WL/2\pi D)\tan^{-1}[Im(WD \cdot WB)/Re(WD \cdot WB)]$, and $\theta 2=(WL/2\pi D)\tan^{-1}[Im(WD^* \cdot WB)/Re(WD^* \cdot WB)]$.

Returning to block 2, if the test is negative, the program branches to block 4.

In block 4, a complex number U is computed from $U=(|S3|^2-|S1|^2/(S2 \cdot S3^* - S1 \cdot S2^*)$.

The next block 7 is a decision block; it asks the question "Is $|U|<2$?". If the test is positive, the program branches to block 8.

In block 8, WB and WD are determined from $WB=|U|/U$ and $WD=(|U|/2)+j\sqrt{1-(|U|/2)^2}$.

Finally, in block 6, an estimate of the angles of arrival is computed from $\theta 1=(WL/2\pi D)\tan^{-1}[Im(WD \cdot WB)/Re(WD \cdot WB)]$, and $\theta 2=(WL/2\pi D)\tan^{-1}[Im(WD^* \cdot WB)/Re(WD^* \cdot WB)]$.

Returning to block 7, if the test is negative, the program branches to block 9. In block 9, WD is set to $WD=1+j0$, and possible values of WB are determined. The possible values of WB are given by the roots of $WB^4 \div (\gamma/\alpha)WB^3 + (\gamma^*/\alpha)WB - (\alpha^*/\alpha)WB = 0$, where $\alpha = S1^*S3$ and $\gamma = S1^*S2 + S2^*S3$.

In the next block 10, the value of the parameter WB which minimizes $L=|S1-WB(WD+WD^*)S2+WB^2S3|^2$ is chosen from the possible values computed in block 9.

Finally, in block 6, an estimate of the angles of arrival is computed from $\theta 1=(WL/2\pi D)\tan^{-1}[Im(WD \cdot WB)/Re(WD \cdot WB)]$, and $\theta 2=(W1/2\pi D)\tan^{-1}[Im(WD^* \cdot WB)/Re(WD^* \cdot WB)]$.

Attached as an Appendix is a listing of a source program for the digital computer 65 to implement the flow chart of FIG. 2. All of the instructions in the source program are in FORTRAN (TM). The source program follows the flow chart and is therefore self-explanatory, i.e. there is correspondence between the flow chart and the program written in FORTRAN (TM). The source program can be entered into the computer with an assembly program in a conventional manner to obtain an object program.

Obviously, many modifications and variations of the present invention are possible in light of the above teachings. It is therefore to be understood that within the scope of the appended claims, the invention may be practiced otherwise than as described.

APPENDIX

```
      PROGRAM MAIN
      DIMEMSION DUM(4)
      COMPLEX*8 S1,S2,S3,WB
      COMPLEX*8
     WD,R,U,ALPHA,GAMMA,A1,A2,A3,A4,TEMP,DUM
      READ 50,S1,S2,S3,THETAB, WL, D, I
50    FORMAT(6E13.6,I12)
      PI=3.14159
      N=4
      IP(I) 100,100,500
100   WB=COMPLX(COS(2.*PI*D*THETAB/WL),
     SIN(2,*PI*D*THETAB/WL))
      R=(S1+WB*WB*S3)/(WB*S2)
      B=REAL((CMPLX(2.,0.)−R*CONJG(R))/(R+CONJG(R)))
      DUM(1)=CMPLX(+1.,0.)
      DUM(2)=CMPLX(−1.,0.)
      V=B+SQRT(B*B+2.)
      IF(ABS(V)−2.) 200,250,250
200   DUM(3)=CMPLX(V/2.,SQRT(1.−(V/2.)*(V/2.)))
      V=B−SQRT(B*B+2.)
      IF(ABS(V)−2.) 210,275,275
210   DUM(4)=CMPLX(V/2.,SQRT(1.−(V/2.)*(V/2.)))
      GO TO 300
250   V=B−SQRT(B*B+2.)
      DUM(3)=CMPLX(V/2.,SQRT(1.−(V/2.)*(V/2.)))
275   N=3
300   CONTINUE
      COSTI=1000000.
      DO 400 J=1,N
      TEMP+S1−WB*(DUM(J)+CONJG(DUM(J)))*S2+
     WB*WB*S3
      COST=REAL(TEMP*CONJG(TEMP))
      IF(COST−COSTI) 350,400,400
350   WD=DUM(J)
      COSTI=COST
400   CONTINUE
      GO TO 1000
500   U=S3*CONJG(S3)−S1*CONJG(S1)
      U=U/(S2*CONJG(S3)−S1*CONJG(S2))
      UMAG=SQRT(REAL(U*CONJG(U)))
      IF(UMAG−2.) 600,600,700
600   WB=CMPLX(UMAG,O.)/U
      WB=CMPLX(UMAG/2.,SQRT(1.−UMAG*UMAG/4.))
      GO TO 1000
700   WD=CMPLX(1.,0.)
      ALPHA=CONJG(S1)*S3
      GAMMA=CONJG(S1)*S2+CONJG(S2)*S3
      A1=−(GAMMA/ALPHA)
      A2=CMPLX(0.,0.)
      A3=CONJG(GAMMA)/ALPHA
      A4=−(CONJG(ALPHA)/ALPHA)
      CALL QUART(A1,A2,A3,A4,DUM(1),DUM(2),
     DUM(3),DUM(4))
      COSTI=1000000.
      DO 800 J=1,N
      TEMP=S1−DUM(J)*(WD+CONJG(WD))*S2+
     DUM(J)*DUM(J)*S3
      COST=REAL(TEMP*CONJG(TEMP))
      IF(COST−COSTI) 750,800,800
750   WB=DUM(J)
      COSTI=COST
800   CONTINUE
1000  CONTINUE
      THETA1=(WL/(2.*PI*D))*ATAN2(AIMAG(WD*WB),
     REAL(WD*WB))
      THETA2=
```

APPENDIX-continued

```
        (WL/(2.*PI*D))*ATAN2(AIMAG(CONJG(WD)*WB)
        1,REAL(CONJG(WD *WB))
        PRINT 2000, THETA1, THETA2
2000    FORMAT(6X,2E13.6)
        END
        ROUTINE SOLVES FOR THE ROOTS OF THE
        QUARTIC POLYNOMIAL
        W**4+P*W**3+Q*W**2+R*W+S=0
        SOLUTION IS FOUND IN
        S. B. BURINTON, HANDBOOK OF MATHEMATICAL
        TABLES AND FORMULAS, HANDBOOK
        PUBLISHERS,
        INC., SANDUSKY,OHIO,1957,PP.9.
        SUBROUTINE QUART(P,Q,R,S,W1,W2,W3,W4)
        COMPLEX*8 P,Q,R,S,W1,W2,W3,W4
        COMPLEX*8 A,B,C,PC,QC,RC,ZL,ZM,ZN
        COMPLEX*8 X1,X2,X3
        COMPLEX*8 FP,FN
        COMPLEX*8 Y1,Y2,Y3,Y4
        A=Q-(3.*P*P/8.)
        B=(P*P*P/8.)-(2.*P*Q/4.)+R
        C=(-3.*P*P*P*P/256.)+P*P*Q/16.-R*P/4.+S
        PC=A/2.
        QC=(A*A-4.*C)/16.
        RC=-(B*B/64.)
        CALL CUBE(PC,QC,RC,X1,X2,X3)
        ZL=CSQRT(X1)
        ZM=CSQRT(X2)
        ZN=CSQRT(X3)
        W1=-ZL-ZM-ZN
        W2=ZL-ZM+ZN
        W3=-ZL+ZM+ZN
        W4=ZL+ZM-ZN
        Y1=-W1-P/4.
        Y2=-W2-P/4.
        Y3=-W3-P/4.
        Y4=-W4-P/4.
        W1=W1-P/4.
        W2=W2-P/4.
        W3=W3-P/4.
        W4=W4-P/4.
        FP=W1*W1*W1*W1+P*W1*W1*W1+Q*W1*W1+
        R*W1+S
        FN=Y1*Y1*Y1*Y1+P*Y1*Y1*Y1+Q*Y1*Y1+R*Y1+S
        COSTP=FP*CONJG(FP)
        COSTN=FN*CONJG(FN)
        IF(COSTP-COSTN) 150,150,100
100     W1=Y1
150     CONTINUE
        FP=W2*W2*W2*W2+P*W2*W2*W2+Q*W2*W2+
        R*W2+S
        FN=Y2*Y2*Y2*Y2+P*Y2*Y2*Y2+Q*Y2*Y2+R*Y2+S
        COSTP=FP*CONJG(FP)
        COSTN=FN*CONJG(FN)
        IF(COSTP-COSTN)250,250,200
200     W2=Y2
250     CONTINUE
        FP=W3*W3*W3*W3+P*W3*W3*W3+Q*W3*W3+
        R*W3+S
        FN=Y3*Y3*Y3*Y3+P*Y3*Y3*Y3+Q*Y3*Y3+R*Y3+S
        COSTP=FP*CONJG(FP)
        COSTN=FN*CONJG(FN)
        IF(COSTP-COSTN) 350,350,300
300     W3=Y3
350     CONTINUE
        FP=W4*W4*W4*W4+P*W4*W4*W4+Q*W4*W4+
        R*W4+S
        FN=Y4*Y4*Y4*Y4+P*Y4*Y4*Y4+Q*Y4*Y4+R*Y4+S
        COSTP=FP*CONJG(FP)
        COSTN=FN*CONJG(FN)
        IF(COSTP-COSTN) 450,450,400
400     W4=Y4
450     CONTINUE
        RETURN
        END
        ROUTINE SOLVES FOR THE ROOTS OF THE
        CUBIC POLYNOMIAL
        X**3+P*X**2+Q*X+R=0
        SOLUTION IS FOUND IN
        S. B. BURINGTON, HANDBOOK OF
        MATHEMATICAL
        TABLES AND FORMULAS,
```

APPENDIX-continued

```
        HANDBOOK PUBLISHERS
        INC., SANDUSKY, OHIO,1957,PP. 7-9
        SUBROUTINE CUBE (P,Q,R,X1,X2,X3)
        DIMENSION AD(3),BD(3),S1(3,3),S2(3,3),S3(3,3)
        COMPLEX*8
        P,Q,R,X1,X2,X3,A,B,DUM1,DUM2,CONST
        COMPLEX*8 S1,S2,S3,AD,BD
        COMPLEX*8 ROOT1,ROOT2,ROOT3
        COMPLEX*8 R1,R2,R3,POLY
        COMPLEX*8 POLY1,POLY2,POLY3
        COMPLEX*8 POL1,POL2,POL3
        PI=3.1415926536
        PI2=2.*PI
        CONST=CMPLX(0.,SQRT(3.)*.5)
        A=(3.*Q-P*P)/3.
        B=(2.*P*P*P-9.*P*Q+27.*R)/27.
        DUM1=(B*B/4.)+(A*A*A/27.)
        DUM1=CSQRT(DUM1)
        DUM2=-(B/2.)+DUM1
        AMAG1=DUM2*CONJG(DUM2)
        AMAG1=SQRT(AMAG1)
        AMAG1=AMAG1**(1./3.)
        ANG1=ATAN2(AIMAG(DUM2),REAL(DUM2))
        DUM=-(B/2.)-DUM1
        AMAG2=DUM2*CONJG(DUM2)
        AMAG2=SQRT(AMAG2)
        AMAG2=AMAG2**(1./3.)
        ANG2=ATAN2(AIMAG(DUM2),REAL(DUM2))
        DO 100 I=1,3
        FI=I-1
        ARG1=(ANG1+PI2*FI)/3.
        ARG2=(ANG2+PI2*FI)/3.
        AD(I)=CMPLX(AMAG1*COS(ARG1),
        AMAG1*SIN(ARG1))
        BD(I)=CMPLX(AMAG2*COS(ARG2),
        AMAG2*SIN(ARG2))
        DUM1=AD(I)*AD(I)*AD(I)
        DUM2=BD(I)*BD(I)*BD(I)
100     CONTINUE
        COST0=1000000000000.
        DO 300 I=1,3
        ROOT1=AD(I)+BD(I)
        ROOT2=-(AD(I)+BD(I))*.5+CONST*(AD(1)-BD(I))
        ROOT3=-(AD(I)+BD(I))*.5-CONST*(AD(1)-BD(I))
        R1=ROOT1-P/3.
        R2=ROOT2-P/3.
        R3=ROOTS-P/3.
        POLY=ROOT1*ROOT1*ROOT1+A*ROOT1+B
        POLY=POLY+ROOT2*ROOT2*ROOT2+
        A*ROOT2+B
        POLY=POLY+ROOT3*ROOT3*ROOT3+
        A*ROOT3+B
        POL1=ROOT1*ROOT1*ROOT1+A*ROOT1+B
        POL2=ROOT2*ROOT2*ROOT2+A*ROOT2+B
        POL3=ROOT3*ROOT3*ROOT3+A*ROOT3+B
        COST1=POL1*CONJG(POL1)
        COST2=POL2*CONJG(POL2)
        COST3=POL3*CONJG(POL3)
        COST=COST1+COST2+COST3
        IF(COST-COST0) 250,250,300
250     X1=R1
        X2=R2
        X3=R3
        COST0=COST
300     CONTINUE
        RETURN
        END
```

What is claimed as new and desired to be secured by Letters Patent of the United States is:

1. A method of estimating the angles of arrival $\theta 1$ and $\theta 2$ of two closely spaced radar targets of which one target may be the virtual image of the other target, and tracking those targets, comprising the steps of:
   (a) illuminating the targets with a radar beam of wavelength WL:
   (b) receiving the resulting echoes from the targets at three directive antennas whose apertures are coplanar and whose phase centers are colinear and spaced a distance D apart;

(c) converting the received echos to complex numbers S1, S2 and S3, representing the magnitude and phase of the respective echos received by the three directive antennas;

(d) if the plane of symmetry of the two targets is known, solving for the value of the parameter WD which minimizes $$L = |S1 - WB(WD + WD^*)S2 + WB^2 S3|^2$$

where
$$WB = exp(j2\pi D\theta B/WL)$$

and $\theta B$ is the known angle bisecting the angles of arrival of the two targets; and (e) calculating the angles of arrival $\theta 1$ and $\theta 2$ from $$\theta 1 = (WL/2\pi D)\tan^{-1}[Im(WD \cdot WB)/Re(WD \cdot WB)],$$
and
$$\theta 2 + (WL/2\pi D)\tan^{-1}[Im(WD^* \cdot WB)/Re(WD^* \cdot WB)];$$

(f) if the plane of symmetry of the two targets is not known, solving for the values of the parameters WD and WB which minimize $$L = |S1 - WB(WD + WD^*)S2 + WB^2 S3|^2;$$

(g) calculating the angles of arrival $\theta 1$ and $\theta 2$ from $$\theta 1 = (WL/2\pi D)\tan^{-1}[Im(WD \cdot WB)/Re(WD \cdot WB)],$$
$$\theta 2 = (WL/2\pi D)\tan^{-1}[Im(WD^* \cdot WB)/Re(WD^* \cdot WB)];$$

and, (h) tracking said two closely spaced radar targets in accordance with the angles of arrival $\theta 1$ and $\theta 2$ for said respective targets.

2. The method recited in claim 1 wherein step (d) includes the step of:

choosing a value of WD from four possible values such that WD minimizes the function L, the four possible values being given by $$WD = 1 + j0, \text{ or}$$
$$WD = -1 + j0, \text{ or}$$
$$WD = (V/2) + j\sqrt{1 - (V/2)^2},$$

where V is bi-valued, the two values of V being the roots of $$V^2 + 2[(2 - |R|^2)/(R + R^*)] - 2 = 0$$

which satisfy $|V| < 2$, and where $$R = (S1 + WB^2 S3)/(WB \cdot S2).$$

3. The method recited in claim 1 wherein step (f) includes the steps of:

computing $$U = \frac{(|S3|^2 - |S1|^2)}{S2 \cdot S3^* - S1 \cdot S2^*} \text{; and}$$

If $|U| < 2$:
determining WB and WD from $$WB = |U|/U, \text{ and}$$

$$WD = (|U|/2) + j\sqrt{1 - (|U|/2)^2} \text{ ;}$$

If $|U| < 2$:
setting $WD = 1 + j0$;
computing possible values of WB from the roots of $$WB^4 - (\gamma/\alpha)WB^3 + (\gamma^*/\alpha)WB - (\alpha^*/\alpha)\ WB = 0$$

where $\alpha = S1^*S3$, and $$\gamma = S1^*S2 + S2^*S3; \text{ and}$$

choosing the value of WB which minimizes the function L.

* * * * *